May 16, 1933.　　H. VON BERTRAB　　1,909,923
GEODETIC INSTRUMENT
Filed April 5, 1929　　3 Sheets-Sheet 1

Inventor:
Hermann von Bertrab
by C. P. Goepel
his Atty.

May 16, 1933.  H. VON BERTRAB  1,909,923
GEODETIC INSTRUMENT
Filed April 5, 1929   3 Sheets-Sheet 3

Inventor:
Hermann von Bertrab
by C. P. Grepel
his Atty.

Patented May 16, 1933

1,909,923

UNITED STATES PATENT OFFICE

HERMANN von BERTRAB, OF BERLIN-HALENSEE, GERMANY

GEODETIC INSTRUMENT

Application filed April 5, 1929. Serial No. 352,618.

This invention relates to geodetic instruments, the invention being more particularly related to an improved construction of this character through the agency of which to produce representations or projections of a three-dimensional object by projecting photographic pictures of the object through mirrors and objective instruments upon a suitable plane of projection such as a photographic plate or upon a mark system.

In the preferred embodiment of my invention and in the manner as hereinafter set forth, I construct and arrange for adjustment both vertically and horizontally a binocular stereoscopic telescope apparatus which includes in its construction the means for carrying the photographic pictures of the object to be projected and also the mirror and objective instruments by means of which the planes of representations or pictures of the object are produced upon a surface. For convenience of differentiation, the apparatus referred to may, as an entity, be termed a stereo-reflector, in contradistinction to that portion or part of the instrument carrying the planes or surfaces whereon the picture representations are reproduced. One of the important objects of the present invention is to so construct and arrange the stereo-reflector apparatus that it will, for purposes of displacement and adjustment, be entirely independent of the reproducing surface which is constructed and arranged for use as a drawing surface, and which, itself, is mounted and arranged for adjustment to any inclination or position desired or necessary for receiving the images of the photographic pictures to be reproduced.

The stereo-reflector apparatus is adjustable without changing in any way the adjustment of the pictures carried thereby, and having been once adjusted to the position necessary for carrying out a drawing operation, it can be maintained in its precise adjusted position until the drawing operation is completed. The mirror system which forms part of the stereo-reflector provides for an adjustment of the initial position of the pictures in a way that permits the production of the spatial form upon a surface where the drawing is to be made. With my stereo-reflector apparatus, the photographic pictures do not themselves require adjustment and the use of the usual complicated ruler mechanisms is entirely eliminated. In order to adjust differences in the bases or in the heights certain of the reflecting or dividing devices are made adjustable both in a horizontal and in a vertical direction. Owing to the apparent motion of the centers of the photographic pictures during rotation of the mirrors provision is made for horizontal displacements in the direction of both coordinates.

Preferably, the front mirrors are arranged for displacement with respect to the objective lenses, since thereby within certain limits a substitute is always available for some other displacement in the apparatus. These displacements, however, need not be utilized if the marking system is properly determined and utilized, for the photographic pictures, with the exception of being rotatable within their planes, are maintained in the desired position through the adjustment of the stereo-reflector.

Each of the objective or lenses is mounted for rotation about its nodal point, so that within a range of motion it is possible to adjust every desired direction of the optical axis. The range of movement required for this purpose depends upon the magnifying factor. It decreases with increasing enlargement under the assumption that the photographic pictures themselves are reduced representations of the object. With the aid of the so-called wide angle objectives, however, it will be possible to produce photographic pictures in planes having any desired angle of inclination without any distortion; or utilizing the alternative, way to project an image of a mark upon the photographic pictures. It is not sufficient, in the present case, if the objective is rotatable only around a single axis, as has been proposed in connection with other apparatus essentially designed for more limited use. In order to enable the optical axis to be moved entirely through a full conical space, the objective of my present instrument must be rotatable around a second axis. If the adjusting movement of the objective is coupled with the movement of a mirror, preferably only with the movement of a front mirror, said adjusting movement may be accomplished by means of a simple triangular slide, in order automatically to maintain a movement which is determined by a sine-function. However, adjustment by hand is not attended by any serious difficulties. Under this arrangement, every kind of coupling member, intermediate the representations of the object and the camera is dispensed with. An essential feature of the described arrangement, therefore, resides in the fact that no distance adjustments need be made, but only adjustments in the directions of the conjugate planes and of the axes of the objectives. This results in the advantage of dispensing with the usual couplings which are required to adjust the distance of the plane of projection within certain limits, without in any way affecting the other parts of the apparatus.

According to my invention, in contradistinction to known apparatus, the direction of the optical axis is in general not perpendicular to the photographic picture and not coincident with the direction of the optical axis during exposure. By displacing the objective and the plate holder or measuring frame relatively to each other the proper distance of the point of rotation may always be easily ascertained. On the other hand, the distance of the focus from the objective will only have an effect upon the magnifying factor and is quite irrelevant for the procedure of adjustment. The two objectives may easily be replaced by others in order to produce any desired magnifying effect in accordance with the focal distance. The displacements of the front nodal points or of the apertures of the objectives are carried out quite automatically in my present stereo-reflector solely by the procedure of adjustment. In order to further facilitate the adjustment, the objectives may be provided with sighting marks or the like at the front nodal points.

In general two photographic pictures of the same object are placed each into one of the two reflector systems of the stereo-reflector herein described, which is thereupon properly adjusted for the reproduction of the three-dimensional object. It will be understood, however, that more than two photographic pictures of the object to be reproduced may be employed, if the stereo-reflector comprises a corresponding number of reflector systems. Also, the several systems of the stereo-reflector may be used individually in order to reproduce a perspectively distorted picture of a plane object in undistorted form. For this special purpose it is preferable to avoid insofar as possible movements of large and heavy masses and to provide facilities for adjustment within the largest possible limits.

Other objects and aspects of my invention will appear hereinafter.

The invention consists in the improved geodetic instrument and system for copying purposes, and in the form, construction and relative arrangement of the several parts, as will be hereinafter more fully described, illustrated in the accompanying drawings and subsequently incorporated in the subjoined claims.

The invention will best be understood by referring to the accompanying drawings, wherein I have illustrated a simple and preferred embodiment of the apparatus, and in which.

Figure 1:
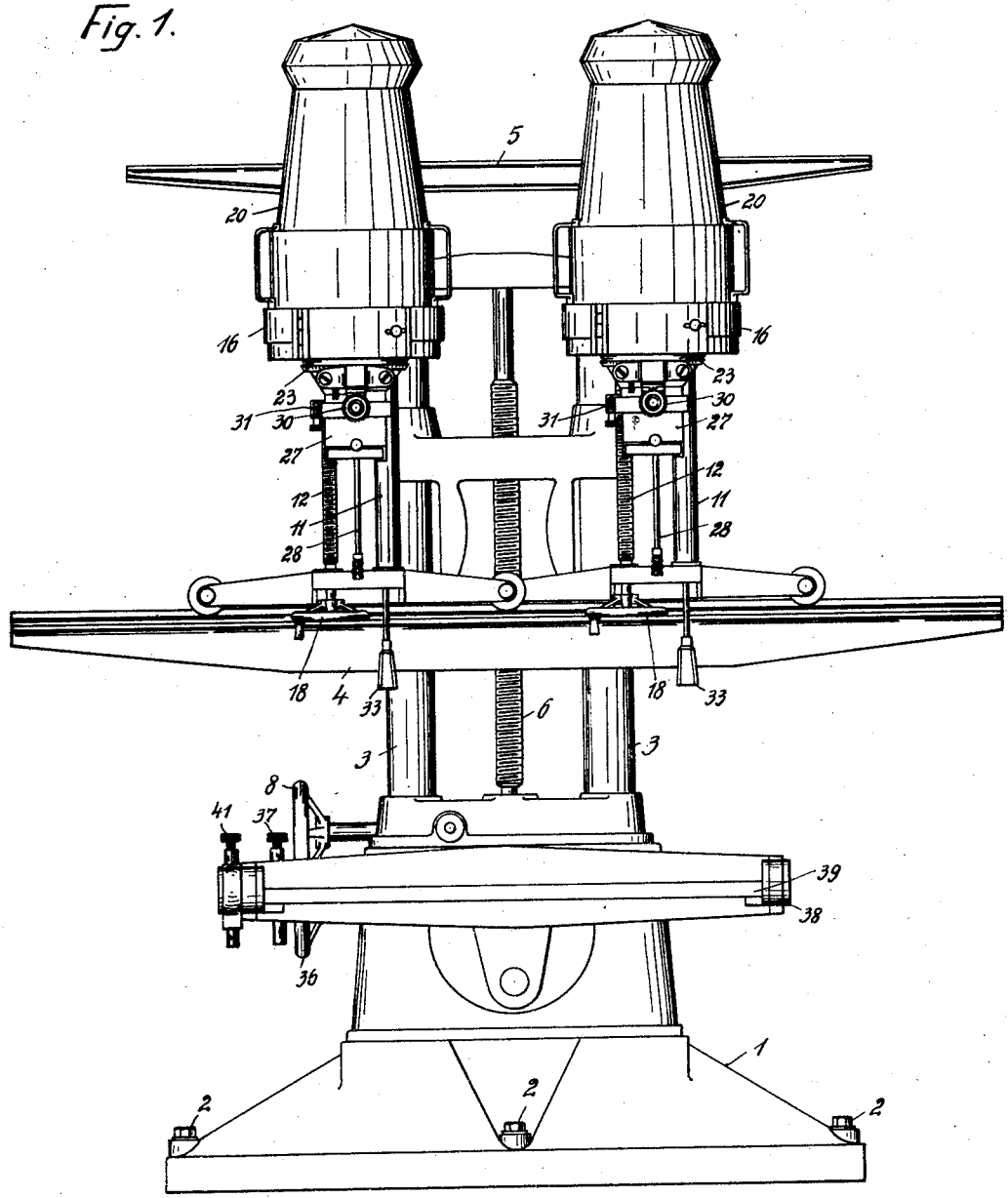
Figure 1 is a view in front elevation of a device made in accordance with my invention.
Figure 2:
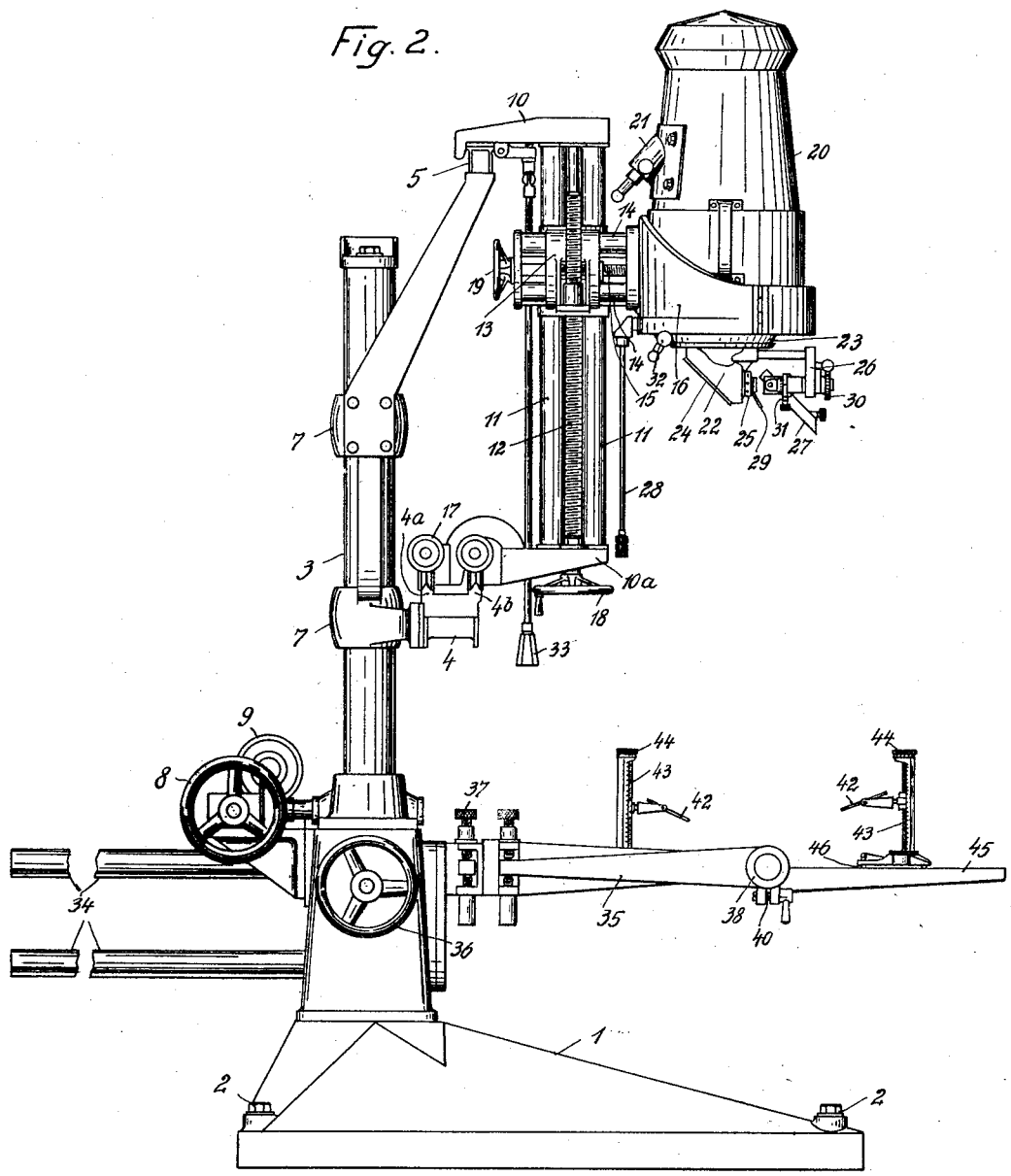
Fig. 2 represents a side view thereof, with some of the parts of the stereo-reflector omitted.
Figure 3:
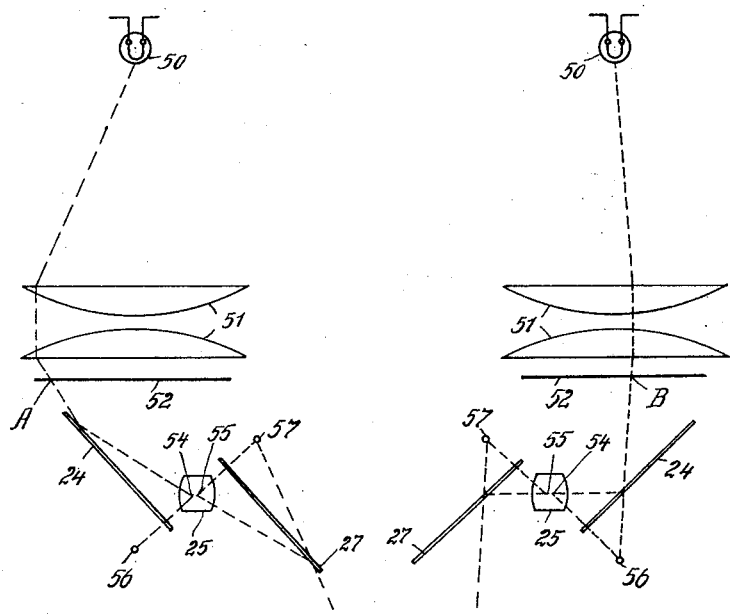
Fig. 3 is a diagrammatical view, illustrating the paths of the rays of light from the sources of light to the point of union upon the drawing table.
Figure 5:
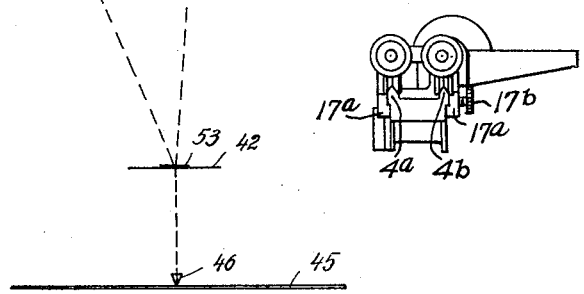
Fig. 5 is a detail vertical side view of Fig. 4.
Figure 4:
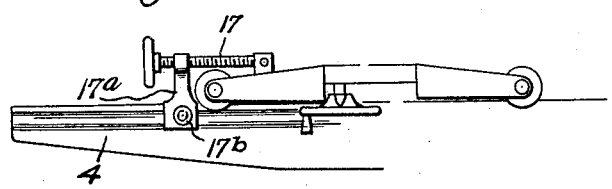
Fig. 4 is a detailed vertical front view of the spindle adjusting means, carriage and rails shown in Fig. 2.

The same reference characters designate corresponding parts in Figs. 1 and 2, while in Fig. 3 other and special reference characters are used for convenience of special description.

From Figs. 1 and 2 it will be apparent that the stereo-reflector constructed according to my invention consists essentially of five parts, to-wit: First, a frame forming the support of the stereo-reflector, second, two supporting carriages together with two reception rings for the picture-carriers and the illuminating devices, third, the picture-carriers and the illuminating devices for the pictures, fourth, the drawing table with auxiliary devices and fifth, the contrivances which serve for intermittent illumination of the apparatus as well as for re-constructing the three-dimensional object from its photographic representations.

The frame which forms the support of the stereo-reflector rests on a base 1 of light metal, which base may be fixed by means of screw-bolts 2 or the like upon a suitable surface. The base 1 carries a pair of vertical guide columns 3 which support the parallel bars or rails 4 and 5. The bar 4 is provided with two guideways 4a and 4b for properly mounting the two supporting carriages to permit horizontal sliding of said carriages upon said guideways. Intermediate the two columns 3 there is mounted a screw spindle 6 which permits raising and lowering of the bars of rails 4 and 5, a special guide-member 7 being used for this purpose.

Each of said supporting carriages consists of the guide-rails 10 and 10a, the guide-columns 11, the screw spindle 12 and the cross-member 13 with the horizontal guide-columns 14 and the screw spindle 15 mounted intermediate said guide-columns 14. The columns 14 carry the annular members 16 which serve for the reception of the picture carriers. Transverse adjustment of the supporting carriages may be preliminarily accomplished by hand by means of the guide-rails 10 and 10a upon the parallel rails 4 and 5, while the fine adjustment of said supporting carriages may be effected by the screw spindle 17 mounted in threaded holder 17a. The latter holder is in turn mounted on the rails 4 and 5 by engaging means 17b. It is to be noted that turning the handle of spindle 17 causes a very gradual movement of the carriages whereby an easy and at the same time a delicate adjustment of the carriages is obtained. Vertical motion may be imparted to the cross-member 13 together with the annular members 16 by the aid of the screw spindles 12 and the hand-wheels 18, while the annular members 16 may be adjusted by means of the screw spindle 15 and the hand-wheel 19 in the direction of said spindle.

The annular members 16 serve for the reception of the picture-carriers, which are mounted in position by means of bayonet slot connections with said members 16, while the illuminating devices are mounted upon an extension provided within said annular members 16.

The illuminating devices for each of the picture-carriers consists of a hood 20, a projection lamp provided within said hood, a contrivance 21 for adjusting said lamp and the condensers likewise mounted within the hood 20. The hoods 20 and the contrivances 21 are of ordinary and well-known construction and are parts used in ordinary projecting lamps in the stereoreflecting art.

The picture-carriers 22 are of prismatic shape and at their upper open side merge into a rim 23 which carries the bearing member for the photographic plate. Fixed to the rear oblique wall of the picture-carrier 22 is a mirror 24 positioned in the interior of said picture-carrier, while the front wall of the picture carrier 22 carries the objective or lens 25. In front of the objective there is mounted the suspension device 26 for the movable mirror 27, said suspension device being rigidly connected to said picture-carrier 22. After switching-in the lamp, the picture on the plate which is inserted into the picture carrier will be projected upon the drawing table by way of the fixed mirror 24, the objective 25 and the movable mirror 27.

The bearing members for the photographic plates consist of a frame provided with the measuring marks arranged in accordance with those in the measuring chambers. When inserting the plates, the marks on the frame are brought into coincidence with the marks on the picture and thereupon the frame is placed into the upper part of the picture-carrier. The frames, at the same time are so guided that after fixing said frames the optical axis of the objective 25 will be deflected by the interior mirror so as to come into perpendicular position with respect to the plate-cross.

In order to properly adjust with respect to each other the two images projected upon the drawing table through the two picture-carriers the following motions are made:

First, a horizontal rotation of the plate around the optical axis performed by means of the flexible shaft 28 to adjust the edging of the photographs and the plates; second, a motion of the objective 25 within a conical space having its apex co-inciding with the rear main point of the objective 25, said motion being accomplished by means of the handle 29. By this step a sharper outline of the photographed object is obtained. Also the step provides for adjustment so that the projecting plane will be parallel to the plane of the photograph.

Third, rotation of the outer mirror 27 around the horizontal optical axis of the objective 25, said rotation being effected by the worm-gear 30. With this step proper adjustment of the slope of the photograph is effected.

Fourth, inclining said outer mirror 27 with respect to the said optical axis, this being done by the worm-gear 31 to more delicately adjust the slope of the photograph;

Fifth, rotation of the picture-carrier around the vertical optical axis, this rotation being due to the worm-spindle 32. In this step the azimuth of the photograph is adjusted, and Sixth, fixing of the supporting carriage and therewith of the picture-carriers after final adjustment of the pictures by means of the clamping lever 33 to finally secure the adjustments made in the above steps.

The drawing table 45 is mounted within a Cardan joint and displaceable in horizontal direction. The base 1 carries the bearing surfaces for the horizontal guide-columns 34 to which the fork 35 is fixed. The horizontal displacement of the fork 35 is accomplished by the hand-wheel 36, while the upper guide-column is constructed to form a bearing permitting rotation of the fork 35 around its longitudinal axis. The fork 35 is rotated by hand, and finely adjusted by means of the clamping screw 37. At its end the fork 35 carries the bearings 38 in which bearings there is mounted the transverse axis of the drawing table. Motion of the table and of the said transverse axis thereof is likewise effected by hand and after drawing tight the screw 40, said table is finely adjusted upon by the adjusting screws 41.

Small projection surfaces or small drawing tables 42 are provided on the main drawing table 45, which surfaces or small tables may be freely moved by hand. These surfaces or small tables may be adjusted in vertical direction by means of the screw-heads 44, which permit an adjustment of 0.01 mm to be read off. The surfaces or small tables 42 may be swung around a transverse axis within which there is provided a mark indicating the adjustment. Below said mark there is mounted the drawing pencil 46 in a vertical position with respect to the drawing table.

The devices serving for intermittent illumination are well-known and generally comprise two projecting lamps, each having a separate circuit and circuit breaker whereby one or the other lamp is switched on or off intermittently. In this connection, when one lamp is switched on, the other is switched off and vice versa, thus tending to produce a twinkling effect. The twinkling of the lights will not be observed once the pictures or photographs exactly cover each other.

Intermittent illumination is carried out by discs which are rotated in front of the objectives 25, which discs alternately close and open the apertures of said objectives.

In order now to reconstruct the three-dimensional object, one objective is provided with a red and the other with a green color filtering device. If now the projected pictures are inspected by means of spectacles having a green and a red glass, a plastical image of the three-dimensional object will be obtained in the well-known manner. This plastical image of the object may also be used for representing the three-dimensional object on a profiled map or the like.

Fig. 3 shows diagrammatically the optical construction of my present stereo-reflector, the mirrors shown in Fig. 3 being shown displaced by 90° against their position of rest as shown in Figs. 1 and 2. The course of the rays which serve for producing the projection are indicated in Fig. 3 for two corresponding points A and B. The light-rays which emanate from the light source 50 are passed through the condensers 51 to said points A and B on the plates 52 and from here by way of the mirrors 24, the objectives 25 and the mirrors 27 as far as to the mark 53 on the movable surface of projection 42 on which corresponding rays will intersect each other. Perpendicularly below the point of intersection, the drawing pencil 46 will indicate upon the drawing surface 45 the plan of the respective point of the three-dimensional object.

The points 56 and 57 represent the apparent location of the center of projection, that is the nodal points 54 and 55 of the objectives 25, with respect to the mirrors 24 and 27. All light rays coming from the plates 52 and passing to the mirrors 24 will converge at the points 56, while the rays coming from mirrors 27 and passing to the mark 53 will converge at the points 57.

The plates 52 are rotatable around axes passing through the points 56 and positioned perpendicularly to said plates at their centers. The camera systems together with their mirrors, are likewise rotatable around the same axes. More particularly, the front mirrors 27 are each rotatable around two axes, one of said axes passing through the appertaining objective and the other of said axes being preferably positioned within the planes of the mirrors. The objectives are arranged for swinging movement around their rear nodal points 54.

In the drawings it is assumed that the light-rays coming from the three-dimensional object are projected in downward direction upon the photographic plates. The course of the work connected with my present stereo-reflector may be more fully illustrated by the following:

Treatment of pairs of plates:

The two photographic plates representing the same objects are put one on the other so as to cover each other and inserted into the plate frames in such a manner that the measuring marks of the camera which serves to project the pictures are indicated on the plates and brought to co-incidence with the marks on said frames. Thereupon the plate-frames with the plates therein are inserted through a slot into the picture carrier and fixed therein by means of a locking device. In this way every plate will assume such a position that a perpendicular line on the plate-cross will pass by way of the interior fixed mirror through the rear nodal point of the objective which serves for producing the projection. If the two photographs show partly the same object, they are so arranged one above the other that the same object in one plate will correspond with the same object in the other plate. Now the lamp is switched-in, this causing the pictures to be first projected upon the interior mirrors and from here through the said objectives upon the movable outer mirrors from where said pictures are projected into space. The observer, now, has to impart by means of the picture motion device forming part of the instrument a direction which is in agreement with the natural condition of the object at the moment of producing the photographic pictures. This is accomplished in steps. First the two pictures are united into a relief by a mechanical optical procedure, the adjustment of this relief with respect to the horizon being at first not considered. The scale of the pictures may principally be chosen arbitrarily; the scale will positively be determined with approximate accuracy by the height at which the pictures had been made, the focal distances of the objective which had served for the exposure and the projection objective, and in addition, by the distance of the plane in which a sharp picture is obtained from the projection objective. It will be necessary, however, to bring the scales of both pictures into agreement with each other, in case both pictures have not been taken at exactly the same height; this, however, will generally be an exception. It is further necessary to fix the base, that is the distance between the two photographic pictures, which base or distance will be represented in the instrument by the distance of the two projection objectives. Varying the scale—which should be understood in a relative sense, since no definite scale can at the present be considered—as well as fixing the said base or distance is accomplished simultaneously with each other by a procedure of approximation. Variations of the scale may be coarsely adjusted by displacing the picture-carriers upon the vertical spindles, and thereupon finely adjusted by changing the distance between the movable mirror and the objective. On the other hand, variations of the length of the said base may be coarsely adjusted by motion of the picture-carriers along the slide rails of the frame, and thereupon finely adjusted by swinging the negative-carriers and the objective around their vertical axes. Displacements of the terminal points of the base, towards the front or towards the rear, are coursely adjusted by means of a screw provided on the back of the suspension device for the picture-carriers and operated by hand wheel 19, while a fine adjustment may be accomplished likewise by swinging the picture-carriers. After this preliminary work the two pictures or projections of the three-dimensional object to be reproduced or reconstructed are united into a relief. This may be done by causing the light-rays coming from five identical points of both pictures to intersect each other. For this purpose an image of the environs of those points whose rays shall be brought to intersection is produced by means of the mirrors upon the small adjustable drawing tables and now these images are so moved that the images of appertaining points will co-incide in both images. After this has been done with some degree of exactness, the adjustment is tested by intermittent illumination and by sharply adjusting the height; subsequent to this the images are finely adjusted until they will appear in full sharpness. Possibility of moving the two images in all directions without any limitation will be given by rotating and tilting the movable mirrors, swinging the picture-carriers and turning the pictures themselves within their planes.

After a relief of the object has thus been made, said relief must be adjusted with respect to the horizon and its exact scale ascertained. This adjustment may be accomplished in different ways, for instance, as follows:

Three of the small movable drawing tables are so placed on the main drawing table that an image of the environs of each of the three points is produced on one of said small tables; the height of these three points must be known in order to accomplish proper adjustment. The plates of these small drawing tables are now sharply adjusted in accordance with the height of the respective points and now such a position is given to the main drawing table that sharp and distinct images of said three original points will be produced. The exactness of the adjustment may be tested by intermittent illumination. The drawing table will now represent the horizontal plane of the relief. If the marks on the small tables are moved into proximity to the adjusting points and fixed by means of the pencil upon the drawing table perpendicularly below said marks, the exact relative position of the points may now be found in the scale of the relief. If it is desired to draw a map having a definite scale, a correction of the scale may easily be made by final adjustment. Now the map may be drawn out, which is done by the aid of the small drawing tables which serve as auxiliary surfaces of projection when placed upon the main drawing table which is positioned below the relief. As the height of the plates of these small tables may be adjusted, said small tables may be moved into a position above the image at every point thereof and into that height at which two co-ordinate rays intersect. If the mark of the small plate is brought into co-incidence with this point of intersection, the pencil which is positioned vertically below said point will now indicate the appertaining point on the map. The small drawing tables may be placed above every point, and all points of the relief may thus be entered with greatest accuracy into the map. Straight lines are represented in the map by fixing their terminal points and connecting these points by a straight line. Curved lines positioned within a plane may be entered into the map by carrying the mark, after having properly adjusted the height, along said curved line, the drawing pencil now reproducing the motion of the mark. If the line to be represented on the map is inclined, also the mark is carried in like manner by hand along said line, at the same time continuously adjusting with the other hand the height of the mark in accordance with the inclination of said line. By using intermittent illumination all these manipulations may be carried out with increased accuracy. The temporary height of the mark will indicate the height of every desired point, which height may be indicated in hundredths of a millimeter at a proper graduation. This indication now, may be reduced to any desired scale.

In this manner the site-plan of the object is obtained. In order to complete the map, now the lines which connect points of even height must be entered, that is the connecting lines between those points whose rays intersect at even heights or, in case intermittent illumination is employed, between those points which remain at rest. These lines as a rule are difficult to find in case of images which do not move; when employing intermittent illumination, however, these lines will clearly appear since all other points of the image are distinctly in motion. The lines may now easily be followed up by means of the mark which is adjustable in its height and entered into the map. In order to further facilitate the work of re-constructing the object, the small drawing tables are arranged to be tilted around an axis passing through the mark; by this the oscillations of the points which are not positioned at the height of the mark will be increased, so that the lines which are at rest will now appear all the more distinctly. A map with lines connecting points of even height, may be obtained by first adjusting the small drawing table upon an initial height and thereupon drawing out the level line for this height in the manner just indicated. Thereupon the height of the mark is varied to such an extent as would correspond to the desired distance between the several lines of even height and now another line is drawn out. In this manner the work is continued until all lines of even height which fall within the range of the map have been entered thereinto.

In the manner described, therefore, a pair of photographic pictures may be used to produce step-by-step a site-plan including lines which follow points of even height.

Treatment of a series of pictures.

As regards the term "series of pictures" I desire to be understood that when using this expression I intend to define a number of pictures which cover one another in such a manner, that each pair of subsequent pictures which may be termed a "couple of pictures" may be used in connection with an apparatus of the present kind for reproducing a three-dimensional object. The width to which said pictures overlap or cover each other must at least be one half, preferably two thirds of the width of the plates. These series or couples of pictures, now, are treated as follows:

First that pair of pictures is taken out of the series which pair contains the desired terrestrial points of determination; this pair of pictures now is treated in the manner above explained. Thereupon one of the pictures is removed in lateral direction and the subsequent picture of the series added at the other side of said first picture. Since all pictures overlap each other preferably about two thirds of the width of the plates, one half of the overlapping surface of the new couple of pictures has already been used for the reproduction. All points within this part of the picture, therefore, have been determined, and may be used in the same manner as the points which had previously been determined in a terrestrial way. In order to properly adjust a subsequent plate the relief is made by means of the preceding plate. It will be sufficient to use a single point of that part of the plate which had already been used for the reproduction of the object in order to be able to transmit the scale as well as the system of co-ordinates. This procedure is continued with all pictures of the series until a coherent map of the entire series of pictures is obtained. Since the overlapping surfaces of the several plates or pictures are at least equal to two thirds of the width of the plates, every third picture is needed for purpose of adjustment only and can be omitted for the procedure of reproduction.

I claim:

In a structural assembly for a geodetic instrument, a base having vertical pillars, a screw spindle, connected movable guides on the pillars the movement of which is controlled by said spindle, lower and upper horizontal rails carried by the guides, a carriage mounted for movement between the rails and including vertical columns and a screw spindle, a cross member on each column connected to the last named spindle to be elevated and lowered thereby, and an optical projecting device adjustably carried by each of said cross members.

In testimony whereof I affix my signature.

HERMANN von BERTRAB.